(12) United States Patent
Kim et al.

(10) Patent No.: US 6,220,571 B1
(45) Date of Patent: Apr. 24, 2001

(54) ELECTRONIC EXPANSION VALVE FOR COOLING CYCLE

(75) Inventors: Wan-Yong Kim; Kwang-Il Kim, both of Kwangju; Gi-Myung Woo; Lae-Soo Park, both of Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/489,011

(22) Filed: Jan. 21, 2000

(30) Foreign Application Priority Data

Jan. 22, 1999 (KR) .................................................. 99-1880

(51) Int. Cl.7 ...................................................... F16K 1/38
(52) U.S. Cl. ...................... 251/284; 251/903; 251/129.11
(58) Field of Search ............................... 251/129.11, 286, 251/287, 284, 285, 903

(56) References Cited

U.S. PATENT DOCUMENTS 5,364,066 * 11/1994 Dorste et al. .................... 251/903 X
5,419,531 * 5/1995 Hoehn .............................. 251/903 X
5,851,003 * 12/1998 Aoki et al. ................... 251/129.11 X

FOREIGN PATENT DOCUMENTS 60-196477  10/1985  (JP) .
63-297880  12/1988  (JP) .

* cited by examiner

Primary Examiner—Kevin Lee
(74) Attorney, Agent, or Firm—Larson & Taylor PLC (57) ABSTRACT

An electronic expansion valve for a cooling cycle includes a valve housing having intake and exhaust holes and an orifice formed on the exhaust hole. A case is disposed on the valve housing, and a motor is disposed within the case. The motor has a drive shaft extending inside the valve housing. A guide tube is disposed inside the valve housing, the guide tube being vertically or axially movable by rotation of the drive shaft. A needle valve is provided for adjusting an opening of the orifice, the needle valve being mounted on the guide tube. A mechanism is then provided for restricting an axial or vertical movement range of the guide tube and the needle valve, the mechanism being disposed on the drive shaft and the guide tube.

14 Claims, 6 Drawing Sheets

ELECTRONIC EXPANSION VALVE FOR COOLING CYCLE

FIELD OF THE INVENTION

The present invention relates to an electronic expansion valve for a cooling cycle and, more particularly, to an electronic expansion valve for a cooling cycle which can precisely control an amount of coolant to be exhausted by controlling an opening of an orifice.

BACKGROUND OF THE INVENTION

Generally, a cooling cycle used in refrigerators or air conditioners is designed to reduce the temperature of the ambient air by compressing a coolant gas using a compressor, liquefying the compressed coolant gas using a condenser, reducing the pressure of the liquified coolant through an expansion valve, and evaporating the coolant in an evaporator. Particularly, in recent years, the cooling temperature has been automatically controlled by automatically controlling the RPMs of a compressor according to a target temperature using a frequency converting process such as an inverter control method.

Japanese unexamined patent No. S60-196477 discloses an electronic expansion valve which can actively adjust an amount of coolant according to a variation of the RPMs of a compressor through an inverter controller. The expansion valve will be described hereinbelow with reference to FIG. 1.

Figure 1:
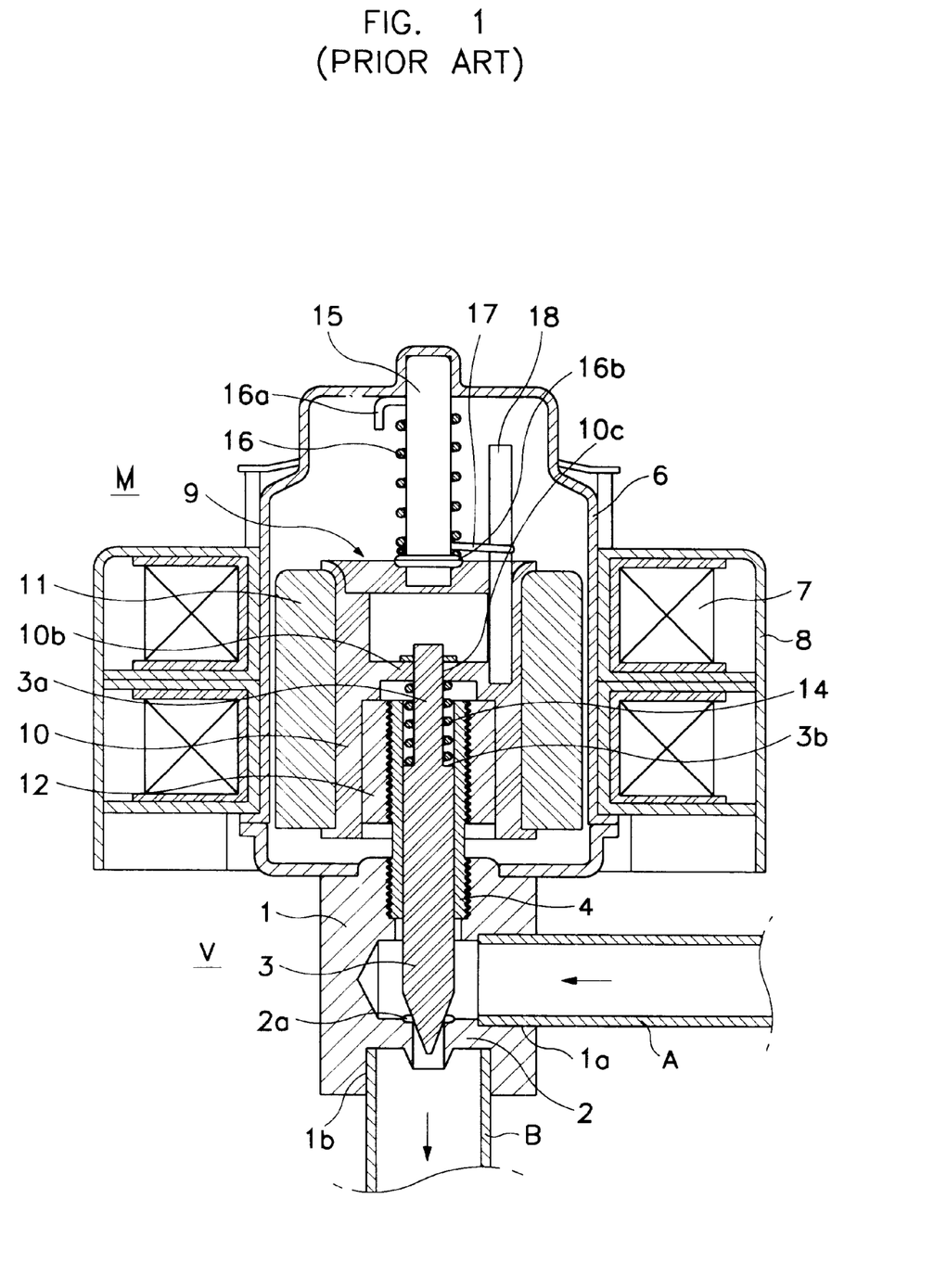
FIG. 1 is a sectional view of a conventional electronic expansion valve.

As shown in the drawing, the electronic expansion valve comprises a valve part V and a stepping motor part M.

The valve part V comprises a valve housing 1 provided at its side with a coolant intake hole 1a on which a coolant tube A connected to a condenser (not shown) is coupled and at its bottom or distal end with a coolant exhaust hole 1b on which a coolant tube B connected to an evaporator(not shown) is coupled. A valve seat 2a is disposed on a partition wall 2 between the intake and exhaust holes 1a and 1b. A needle valve 3 is disposed to contact or move away from the valve seat 2a. That is, the needle valve 3 is slidable in an axial direction and supported within a male screw tube 4 screw-coupled on the valve housing 1.

A sealed case 6 defining the stepping motor part M is disposed on a top or proximal end of the valve housing 1. A stator 8 with a coil 7 is disposed around the case 6 and a rotor 9 is disposed inside the case 6 while being rotatably supported by the mail screw tube 4.

The rotor 9 comprises a permanent magnet 11 embedded around a supporting case 10. A female screw tube 12 is fixed on a lower-inner wall of the supporting case 10 and screw-coupled to the male screw tube 4 so that the rotor 9 is rotatable while being slidable in an axial direction.

A connecting wall 10b is defined at a middle-inner portion of the supporting case 10 and is provided with a penetrating hole 10c in which a smaller diameter portion 3a of the needle valve 3 is fixedly inserted. A coil spring 14 is disposed around the smaller diameter portion 3a of the needle valve 3, while being abutted to the connecting wall 10b.

A center rod 15 is fixed between the rotor 9 and the case 6, and a spiral guide ring 16 is disposed around the center rod 15. A slider 17 is coupled to the spiral guide ring 16 such that it can rotate while moving in a vertical direction along the spiral guide ring 16. An outer end of the slider 17 is hooked on a support rod 18 located on the rotor 9.

In operation, when electric power is applied to the coil 7 of the stator 8, the rotor 9 rotates to ascend and descend the needle valve 3 and the slider 17 along the guide ring 16. At this point, the rotation of the rotor 9 and the movement of the needle valve 3 are stopped at positions where the slider 17 contacts upper and lower ends 16a and 16b of the guide ring 16. That is, by moving the needle valve 3 in the vertical direction, an amount of coolant passing through the valve housing 1 can be properly adjusted, thereby adjusting the pressure.

However, in the above described electronic expansion valve, since the rotor 9 is disposed inside the case 6 and the stator 8 is disposed outside the case 6, an air gap between the coil 7 of the stator 8 and the permanent magnet 11 of the rotor 9 is increased. Accordingly, to precisely generate the torque required for the expansion valve, a relatively large or expensive magnet, e.g. a rare-earth magnet, should be used, increasing the size and manufacturing costs of the expansion valve.

Furthermore, to restrict the rotation range of the rotor 9 and a vertical movement range of the needle valve 3, since the center rod 15, the guide ring 16, the slider 17 and the support rod 18 should be disposed on the top of the rotor 9 disposed inside the case 6, the longitudinal length of the expansion valve is increased.

An initial position of the needle valve 3 is set by screw-coupling the male screw tube 4 to the valve housing 1, then the female screw tube 12 of the rotor 9 to the male screw tube 4. Generally, the initial position of the needle valve 3 is set at a position where the needle valve 3 closely contacts the valve seat 2a to completely close the fluid path. In this initial position, the slider 17 is located at the lower end 16b of the guide ring 16, the slider 17 should then be secured on the support rod 18 located on the rotor 9. However, since there is a limitation in precisely moving the screw, it is very difficult to accurately set the initial position of the needle valve 3 by screw-coupling the valve housing 1 to the male screw tube 4 and the female screw tube 12 to the male screw tube 4. Furthermore, when assembling the expansion valve, there is the possibility that the slider 17 is not exactly secured on the support rod 18 even after the initial position of the needle valve 3 is set.

If the expansion valve is operated in a state where the slider 17 is not exactly secured on the support rod 18, although the needle valve 3 starts its vertical movement from its initial position by the rotation of the rotor 9, the slider 17 stays at the lower end 16b of the guide ring 16 until it contacts the support rod 18. That is, the distance of the vertical movement of the needle valve 3 is defined by the slider 17 which moves between the upper and lower ends 16a and 16b of the guide ring 16. At this point, since the slider 17 starts its vertical movement after the support rod 18 contacts the slider 17, a target distance of the vertical movement of the needle valve 3 may not be obtained, making it difficult to precisely adjust an amount of coolant to be exhausted.

BRIEF SUMMARY OF THE INVENTION

Therefore, the present invention has been made in an effort to solve the above described problems.

It is an objective of the present invention to provide an electronic expansion valve for a cooling cycle which can be reduced in size by employing a stepping motor which is designed to have a smaller gap between a coil of a stator and a permanent magnet of a rotor.

It is another objective of the present invention to provide an electronic expansion valve for a cooling cycle which can be easily assembled by simplifying a coupling structure of a stepping motor and a needle valve.

It is still another objective of the present invention to provide an electronic expansion valve which can precisely adjust an amount of coolant to be exhausted by precisely adjusting an opening/closing timing of an orifice by exactly setting an initial position of a needle valve.

To achieve the above objectives, a first embodiment of the present invention provides an electronic expansion valve for a cooling cycle comprising: a valve housing having intake and exhaust holes and an orifice formed on the exhaust hole; a case disposed on the valve housing; a motor disposed within the case, the motor having a rotating drive shaft extending inside the valve housing; a guide tube disposed inside the valve housing, the guide tube being vertically or axially movable by rotation of the drive shaft; a needle valve for adjusting an opening of the orifice, the needle valve being mounted on the guide tube; and means for restricting a vertical movement range of the guide tube and the needle valve, the means for restricting being connected to the drive shaft and the guide tube.

Preferably, the means for restricting comprises: a rotating plate coupled to the drive shaft; a rotating pin coupled to the rotating plate and extending downward or axially between the guide tube and the valve housing; a guide ring disposed around the guide tube; a slider having a first end contacting the rotating pin and a second end supported on the guide tube so that the slider can vertically move along the guide ring by rotation of the rotating pin; and upper and lower (or proximal and distal) stoppers formed on upper and lower (or proximal and distal) ends of the guide ring, respectively.

The rotating plate is provided with a plurality of coupling holes formed circumferentially about the drive shaft, in one of which the rotating pin is selectively inserted, the coupling holes being spaced away from each other at a predetermined angle.

A plurality of guide pins are formed on a bottom or distal end of the valve housing and extended upward or axially to guide a vertical or axial movement of the guide tube. The guide tube comprises: a cylindrical main body defining a hollow portion, a bottom or distal end of the cylindrical main body being opened; a screw portion formed on an upper portion or proximal end of the main body to be screw-coupled to the drive shaft; and a flange portion radially extending outwards at a lower or distal end of the main body, the flange portion being provided with a plurality of insertion holes into which the guide pins are inserted to guide a vertical or axial movement of the guide tube while restricting a rotation of the guide tube.

The needle valve comprises a larger diameter portion slidably disposed within the hollow portion of the guide tube and a smaller diameter portion extending from the larger diameter portion toward the orifice. The smaller diameter portion is supported by a bushing coupled on an opening portion of the main body of the guide tube, the bushing being provided with a penetrating hole through which the smaller diameter portion of the needle valve passes.

A spring for biasing the needle valve toward the orifice is disposed within the hollow portion of the guide tube.

The bushing is tightly inserted in a lower opening of the guide tube, or screw-coupled to a lower opening or the opened distal end of the main body of the guide tube.

The motor comprises: a motor housing disposed within the case, a stator having a coil and disposed within the motor housing, and a rotor having a permanent magnet and disposed within the motor housing, the rotor being disposed inside the stator and spaced away from the stator at a predetermined gap.

To achieve the above objectives, a second embodiment of the present invention provides an electronic expansion valve for a cooling cycle comprising: a valve housing having intake and exhaust holes and an orifice formed on the exhaust hole; a motor having a rotating drive shaft extending inside the valve housing; a guide tube disposed inside the valve housing, the guide tube being vertically or axially movable by rotation of the drive shaft; a needle valve for adjusting an opening of the orifice, the needle valve being mounted on the guide tube; and means for setting an initial position of the needle valve with respect to the orifice, the means for setting being disposed on the guide tube.

A plurality of guide pins are formed on a bottom or distal end of the valve housing and extended upward or axially to guide a vertical or axial movement of the guide tube.

The guide tube comprises: a cylindrical main body defining a hollow portion, a bottom or distal end of cylindrical main body being opened; a screw portion formed on an upper portion or proximal end of the main body to be screw-coupled to the drive shaft; and a flange portion radially extending outwards at a lower or distal end of the main body, the flange portion being provided with a plurality of insertion holes into which the guide pins are inserted to guide a vertical or axial movement of the guide tube while restricting rotation of the guide tube.

The needle valve comprises a larger diameter portion slidably disposed within the hollow portion of the guide tube and a smaller diameter portion extending from the larger diameter portion toward the orifice.

The means for setting comprises a cylindrical bushing screw-coupled to the opened distal end of the main body of the guide tube to support the needle valve.

A spring for biasing the needle valve toward the orifice is disposed within the hollow portion of the guide tube.

The electronic expansion valve further comprises: a rotating plate coupled to the drive shaft; a rotating pin coupled to the rotating plate and extending downward or axially between the guide tube and the valve housing; a guide ring disposed around the guide tube; a slider having a first end contacting the rotating pin and a second end supported on the guide tube so that the slider can vertically or axially move along the guide ring by rotation of the rotating pin; and upper and lower (or proximal and distal) stoppers formed on upper and lower (or proximal and distal) ends of the guide ring, respectively.

The rotating plate is provided with a plurality of coupling holes formed circumferentially about the drive shaft, in one of which the rotating pin is selectively inserted, the coupling holes being spaced away from each other at a predetermined angle.

BRIEF DESCRIPTION OF THE SEVERAL VIEWS OF THE DRAWINGS

The accompanying drawings, which are incorporated in and constitute a part of the specification, illustrate embodiments of the invention, and, together with the description, serve to explain the principles of the invention.

DETAILED DESCRIPTION OF INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 2:
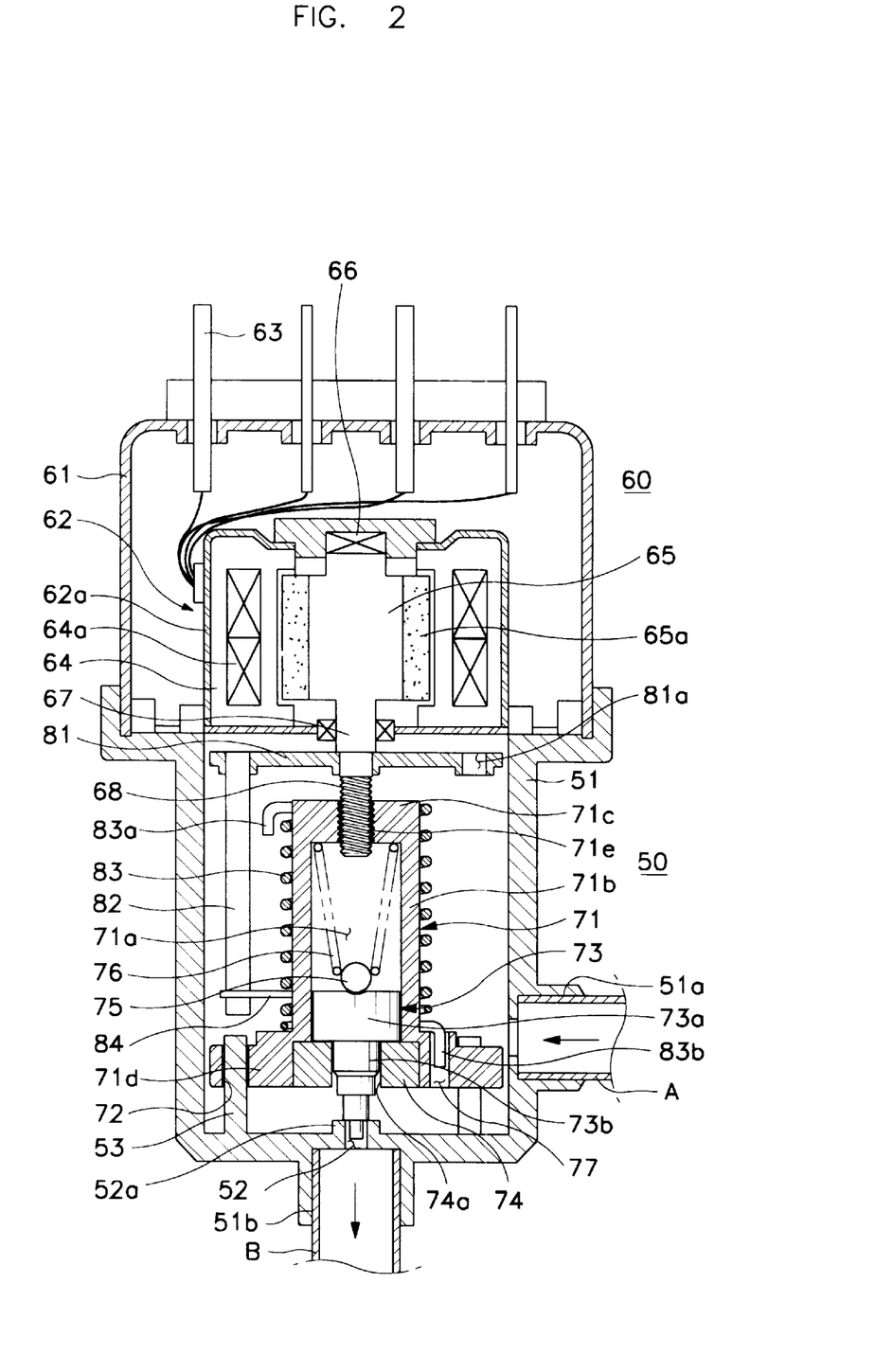
FIG. 2 is a sectional view of an electronic expansion valve for a cooling cycle according to a first embodiment of the present invention.
Figure 3:
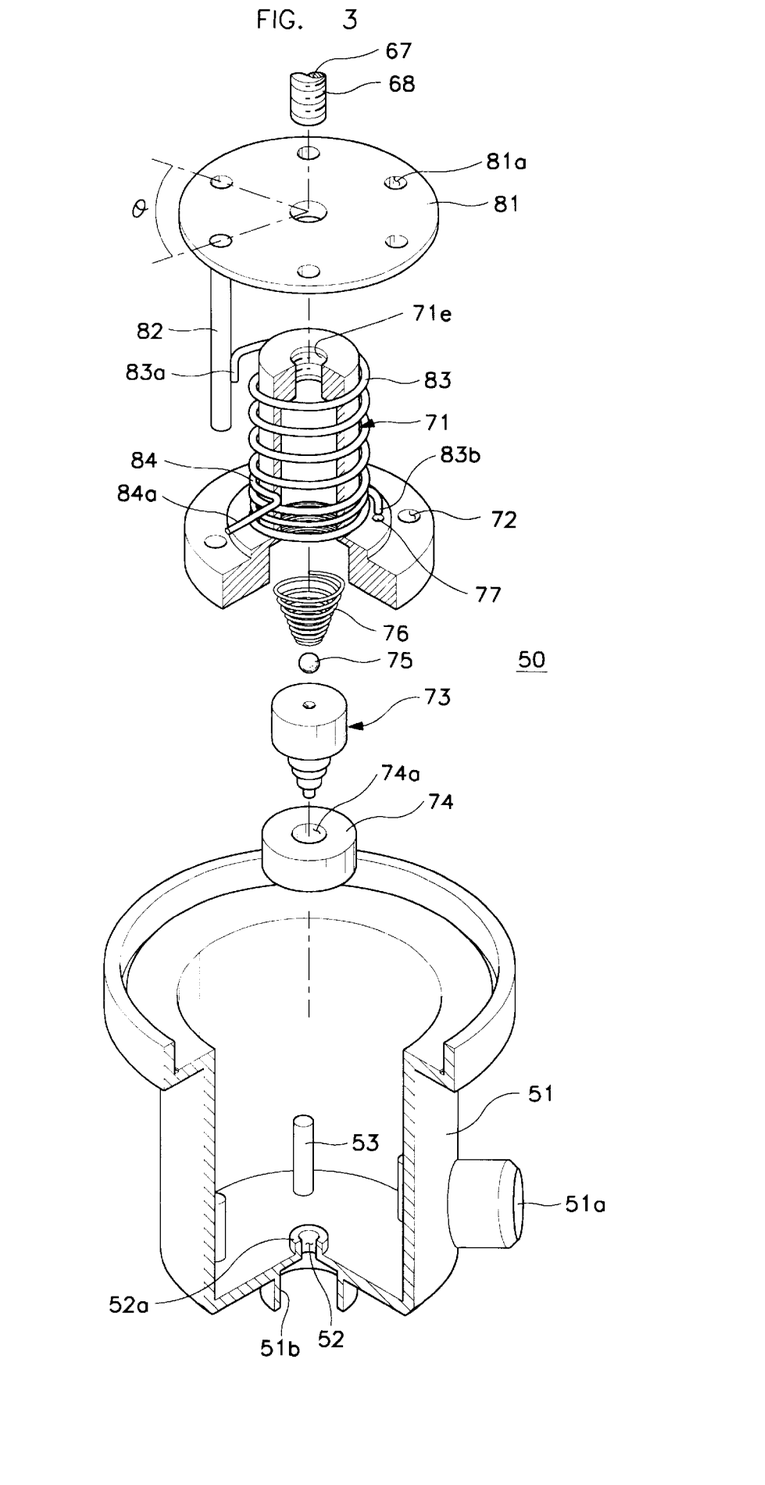
FIG. 3 is an exploded perspective view of a valve part of the electronic expansion valve depicted in FIG. 2.

FIG. 2 shows an electronic expansion valve for a cooling cycle according to a first embodiment of the present invention, and FIG. 3 shows a valve part depicted in FIG. 2.

As shown in the drawings, an electronic expansion valve comprises a valve part 50 for controlling an amount of coolant to be exhausted through the expansion valve and a drive part 60 for driving the valve part 50.

The valve part 50 comprises a cylindrical valve housing 51 having an opening at its top or proximal end. The valve housing 51 is provided at its side with a coolant intake hole 51a to which a coolant tube A connected to a condenser (not shown) is coupled and at its bottom with a coolant exhaust hole 51b to which a coolant tube B connected to an evaporator (not shown) is coupled. The valve housing 51 is further provided at its bottom or distal end with an orifice 52.

A guide tube 71 is disposed inside the valve housing 51. The guide tube 71 is screw-coupled to a drive shaft 67 of the drive part 60 and is designed to move in a vertical or axial direction by a forward/rearward rotation of the drive shaft 67. A plurality of guide pins 53 which are elevated to a predetermined height to guide vertical or axial movement of the guide tube 71 are provided on a bottom or distal edge of the valve housing 51.

The guide tube 71 is opened at its bottom or distal end and comprises: a main body 71b defining a hollow portion 71a, a screw portion 71c having a female screw 71e which is screwed to the drive shaft 67, and a flange portion 71d radially extending at a lower or distal end of the main body 71b. The flange portion 71d is provided with a plurality of insertion holes 72 into which the guide pins 53 are inserted. Each insertion hole 72 is formed on a portion corresponding to each guide pin 53. Accordingly, when the drive part 60 rotates in a forward/rearward direction, the guide tube 71 moves in the vertical or axial direction in a state where the rotation of the guide tube 71 is restricted by the guide pin 53. To realize smooth movement of the guide tube 71 an outer diameter of the flange portion 71d is less than an inner diameter of the valve housing 51.

A needle valve 73 is disposed within the hollow portion 71a of the guide tube 71. The needle valve 73 moves in the vertical or axial direction together with the guide tube 71 to contact or move away from the valve seat 52a of the orifice 52, thereby adjusting an opening of the orifice 52. A cylindrical bushing 74 is tightly inserted into a lower or distal opening of the flange portion 71d to fixedly locate the needle valve 73 within the hollow portion 71a of the guide tube 71.

The needle valve 73 comprises a larger diameter portion 73a disposed within the hollow portion 71a of the guide tube 71 and a smaller diameter portion 73b extending from the larger diameter portion 73a out of the guide tube 71 through a penetrating hole 74a of the bushing 74. The smaller diameter portion 73b is multi-stepped such that a portion of the smaller diameter portion 73b is inserted into the valve seat 52a while another portion thereof is closing the valve seat 52a.

In addition, the needle valve 73 is biased toward the orifice 52 by a coil spring 76, and a ball 75 is disposed on the needle valve 73. The coil spring 76 absorbs shock transmitted to the needle valve 73 and the valve seat 52a when the needle valve 73 contacts the valve seat 52a of the orifice 52, and biases the needle valve 73 to completely close the orifice 52 for preventing leakage of the coolant.

A sealed case 61 defining the drive part 60 is disposed on a top or proximal end of the valve housing 51. A stepping motor 62 for moving the guide tube 71 and the needle valve 73, and a terminal part 63 for receiving electric power are disposed within the sealed case 61.

A stator 64 around which a coil 64a electrically coupled to the terminal part 63 is wound and a rotor 65 around which a permanent magnet 65a is disposed are disposed within a motor housing 62a of the stepping motor 62. The rotor 65 is disposed within the stator 64 and spaced away from the stator 64 at a predetermined gap.

As described above, since the stepping motor 62 is designed such that both of the stator 64 and the rotor 65 are disposed within the motor housing 62a, the gap between the stator 64 and the rotor 65 can be reduced. In addition, since the rotor 65 is not moved in a vertical or axial direction but rotates only, torque required for the operation of the expansion valve can be easily generated even when a smaller magnet is used.

The drive shaft 67 is disposed on the center of the rotor 65 and is supported on the motor housing 62a with bearings 66 disposed therebetween. The drive shaft 67 extends to an inner-upper portion of the valve housing 51 through the motor housing 62a. A male screw 68 is formed on a lower or distal portion of the drive shaft 67, the male screw 68 being screw-coupled to the female screw 71e formed on the screw potion 71c of the guide tube 71 so that the guide tube 71 and the needle valve 73 can vertically or axially move by the screw-coupling of the male and female screws 68 and 71e in accordance with forward/rearward rotation of the drive shaft 67.

When assembling the expansion valve, an initial position of the needle valve 73 is set at a position where the needle valve 73 contacts the valve seat 52a to completely close the orifice 52. The setting of the initial position of the needle valve 73 can be easily performed by simply screw-coupling the male screw 68 of the drive shaft 67 to the female screw 71e of the guide tube 71.

In addition, the electronic expansion valve further comprises a means for restricting the vertical or axial movement range of the guide tube 71 and the needle valve 73, which is disposed on the drive shaft 67 and the guide tube 71. That is, a rotating plate 81 is tightly inserted around the drive shaft 67 so that the rotating plate 81 rotates together with the drive shaft 67. A rotating pin 82 is inserted on an edge of the rotating plate 81 and extended downward or axially between the guide tube 71 and the valve housing 51. As shown in FIG. 3, the rotating plate 81 is provided with a plurality of coupling holes 81a formed in a circumferential direction, the coupling holes 81a being spaced from each other at a predetermined angle Ɏè. That is, the rotating pin 82 is fixedly inserted into one of the coupling holes 81a.

A spiral guide ring 83 is disposed around the main body 71b of the guide tube 71, and a slider 84 which vertically or axially moves while rotating along the guide ring 83 is coupled to the guide ring 83.

Upper and lower or proximal and distal stoppers 83a and 83b are respectively formed on upper and lower or proximal and distal ends of the guide ring 83 to restrict a vertical or axial movement range of the slider 84. The lower or distal stopper 83b is inserted into a fixing hole 77 formed on the flange portion 71d of the guide tube 71.

Figure 4:
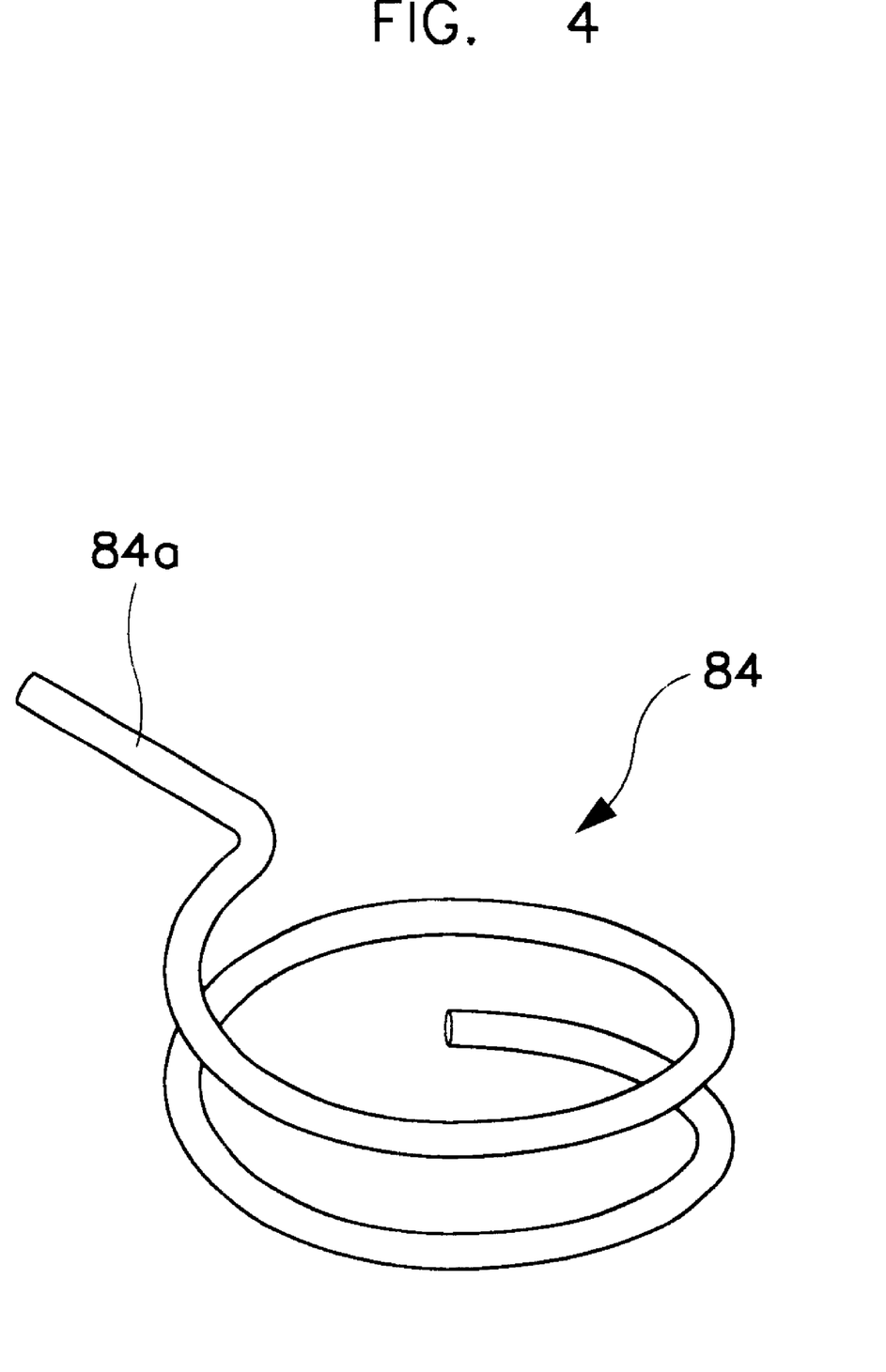
FIG. 4 is a perspective view of a slider of an electronic expansion valve according to a preferred embodiment of the present invention.

As shown in FIG. 4, the slider 84 is loop-shaped so that it can be disposed around the main body 71b of the guide tube 71 between pitches of the guide ring 83, thereby vertically or axially moving while rotating along the guide ring 83. Formed on one end of the slider 84 is a projection 84a which can be supported on the rotating pin 82. Accordingly, when the drive shaft 67 rotates, the guide tube 71 and the needle valve 73 vertically or axially move and, at the same time, the slider 84 moves between the upper or proximal and lower or distal stoppers 83a and 83b by the rotation of the rotating pin 82. The movement of the slider 84 between the upper or proximal and lower or distal stoppers 83a and 83b restricts the vertical or axial movement range of the guide tube 71 and the needle valve 73.

The assembling process and operation of the above-described expansion valve will be described hereinbelow.

First, the spring 76, the ball 75, and the needle valve 73 are inserted within the hollow portion 71a of the guide tube 71 in this order, then the bushing 74 is tightly inserted in the lower or distal opening of the flange portion 71d such that the larger diameter portion 73a of the needle valve 73 is disposed within the hollow portion 71a and the smaller diameter portion 73b of the needle valve 73 extends out of the guide tube 71 through the penetrating hole 74a of the bushing 74.

Next, the guide ring 83 is disposed around the main body 71b of the guide tube 71, then the slider 84 is disposed between pitches of the guide ring 83 while contacting the lower or distal stopper 83b.

After the above, the rotating plate 81 is tightly inserted around the drive shaft 67 of the stepping motor 62, then the female screw 71e of the guide tube 71 is screw-coupled to the male screw 68 of the drive shaft 67 such that the needle valve 73 contacts the valve seat 52a to completely close the orifice 52, thereby completing the setting of the initial position of the needle valve 73.

After the initial position of the needle valve 73 is set as described above, the rotating pin 82 is inserted into one of the coupling holes 81a formed on the rotating plate 81. This will be described more in detail hereinbelow.

To realize a precise vertical or axial movement of the needle valve 73, the slider 84 should vertically or axially move together with the vertical or axial movement of the needle valve 73. Therefore, the rotating pin 82 should be assembled to exactly contact the slider 84 when assembling the expansion valve. However, due to process error of components or assembling error, the rotating pin 82 may be assembled not to contact the slider 84.

Describing more in detail, in the conventional expansion valve (see FIG. 1), when the motor M operates, the needle valve 3 starts its vertical or axial movement from its initial position. At this point, the slider 17 may still stay at the lower or distal end 16b of the guide ring 16 until the slider 17 contacts the support rod 18. That is, after the motor M operates, the support rod 18 coupled to the rotor 9 may rotate by 0iÆ~360iÆuntil it contacts the slider 17, thereby the upward or axial movement of the slider 17 is retarded by a maximum rotation angle of 360iÆof the support rod 18, causing vertical or axial movement error of the needle valve 73.

However, in a preferred embodiment of the present invention, if six coupling holes 81a, for example, are formed on the rotating plate 81 in the circumferential direction and spaced away from each other at an angle of 60iÆ, when the rotating pin 82 is inserted into one of the coupling holes 81a which is in the vicinity of the slider 84, the maximum retardation angle of the rotating pin 82 is reduced to 60iÆ, thereby reducing the vertical or axial movement error of the needle valve 73. Therefore, the opening/closing timing of the orifice 52 can be precisely controlled, improving the operation reliability of the expansion valve.

After the rotating pin 82 is inserted into the rotating plate 81, the valve housing 51 is disposed under the case 61 such that the guide tube 71, the rotating plate 81, and the rotating pin 82 are received in the valve housing 51. Finally, the case 61 is attached on the valve housing 51 using for example epoxy resin.

In operation, in a state where the needle valve 73 is positioned at its initial position where the orifice 52 is completely closed, when electric power is applied to the stepping motor 62 through the terminal portion 63 to increase an amount of coolant to be exhausted through the expansion valve, an electromagnetic field is formed on the coil 64a of the stator 64 in response to an input signal, thereby rotating the drive shaft 67 of the rotor 65. At this point, the rotating plate 81 and the rotating pin 82 rotate together with the drive shaft 67 and, at the same time, the guide tube 71 screw-coupled to the drive shaft 67 moves upward or axially in a state where the rotation thereof is restricted by the guide pins 53. As a result, the needle valve 73 mounted on the guide tube 71 is also displaced upward or proximally to open the orifice 52. Accordingly, the condensed coolant supplied to the valve housing 51 through the intake hole 51a is reduced in pressure while passing through the orifice 52 and the exhaust hole 51b, and then is directed to the evaporator.

In addition, as the rotating pin 82 rotates, the slider 84 is also displaced upward or proximal along the guide ring 83. When the projection 84a of the slider 84 is caught by the upper or proximal stopper 83a of the guide ring 83, the guide tube 71 and the needle valve 73 reach their upper or proximal limit point. At this point, the orifice 52 is opened to its maximum level.

On the contrary, when electric power is applied to the stepping motor 62 through the terminal portion 63 with a signal for reducing an amount of coolant to be exhausted, the drive shaft 67 rotates reversely to move the guide tube 71 and the slider 84 downward or distally. When the slider 84 further moves downward or distally to be caught by the lower or distal stopper 83b of the guide ring 83, the guide tube 71 reaches its lower or distal limit point, making the orifice 52 completely closed by the needle valve 73. In this state, the coolant is not be exhausted through the orifice 52. This is achieved by the spring 76 biasing the needle valve 73 toward the orifice 52.

Figures 5A, 5B:
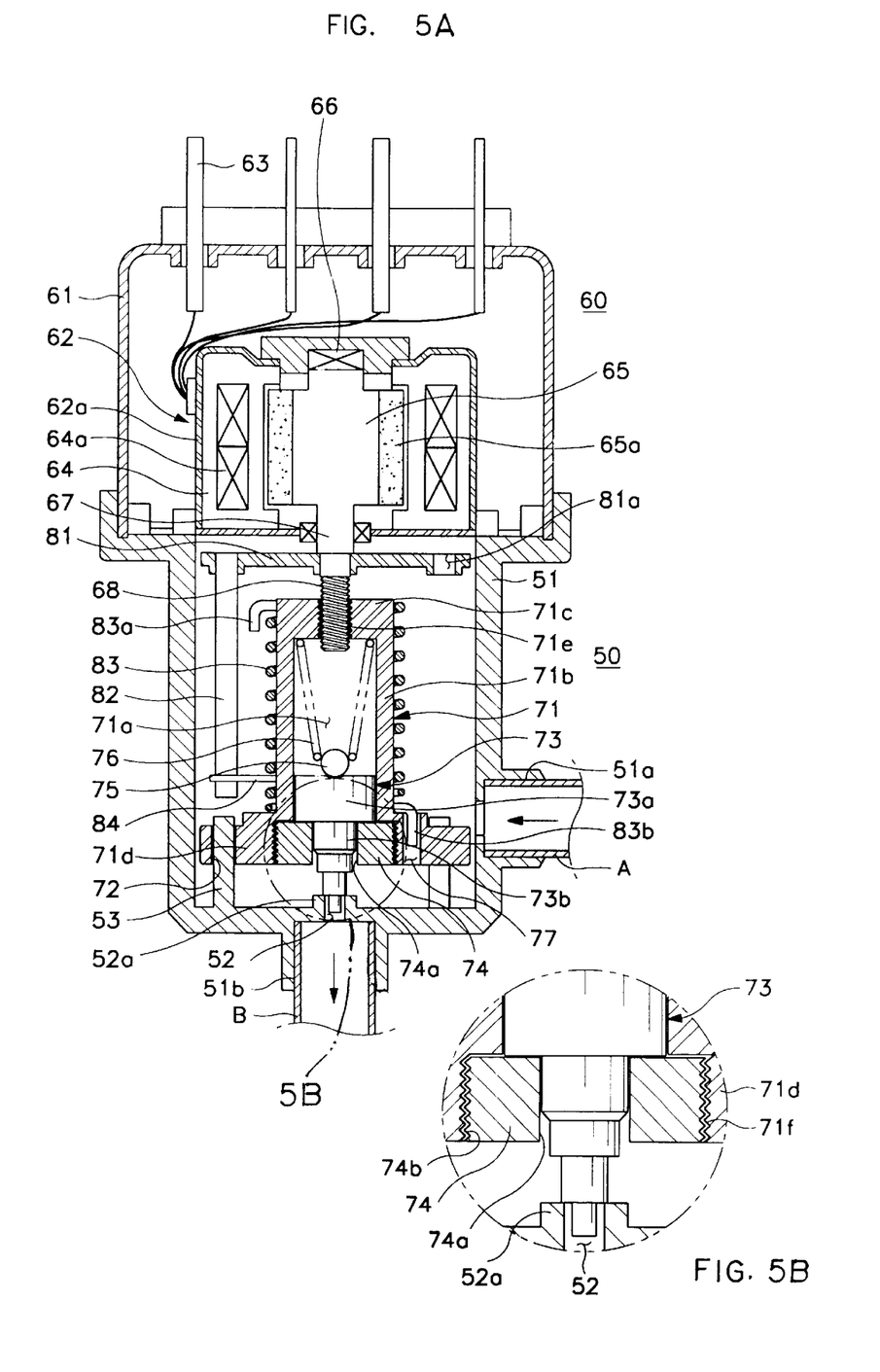
FIG. 5A is a sectional view of an electronic expansion valve for a cooling cycle according to a second embodiment of the present invention.
FIG. 5B is an enlarged portion thereof.

FIG. 5A shows an electronic expansion valve for a cooling cycle according to a second embodiment of the present invention.

The expansion valve of the second embodiment further comprises means for setting an initial position of the needle valve 73 with respect to the orifice 52 more precisely and easily.

In this embodiment as seen better in FIG. 5B, the bushing 74 for supporting the needle valve 73 located within the hollow portion 71a of the guide tube 71 is screw-coupled to the bottom or distal end of the flange portion 71d. That is, the bushing 74 is provided at its outer circumference with a male screw 74b and the flange portion 71d is provided at its inner circumference with a female screw 71f.

Describing more in detail, the initial position of the needle valve 73 can be easily set by screw-coupling the drive shaft 67 to the guide tube 71. However, if there is an error in assembling the expansion valve, the initial position of the needle valve 73 may not be exactly set, deteriorating the operation reliability of the expansion valve.

To solve this problem, in the second embodiment, an initial position error of the needle valve 73 occurring after the drive shaft 67 is screw-coupled to the guide tube 71 can be remedied by adjusting a screw-coupling state of the bushing 74 and the guide tube 71.

That is, as the male screw 74b of the bushing 74 is released from the female screw 71f of the flange portion 71d, the needle valve 73 is further biased toward the orifice 52 by the spring 76. Accordingly, by adjusting the screwing-coupling state of the guide tube 71 and the bushing 74, the initial position of the needle valve 73 can be more precisely and easily set.

Figure 6:
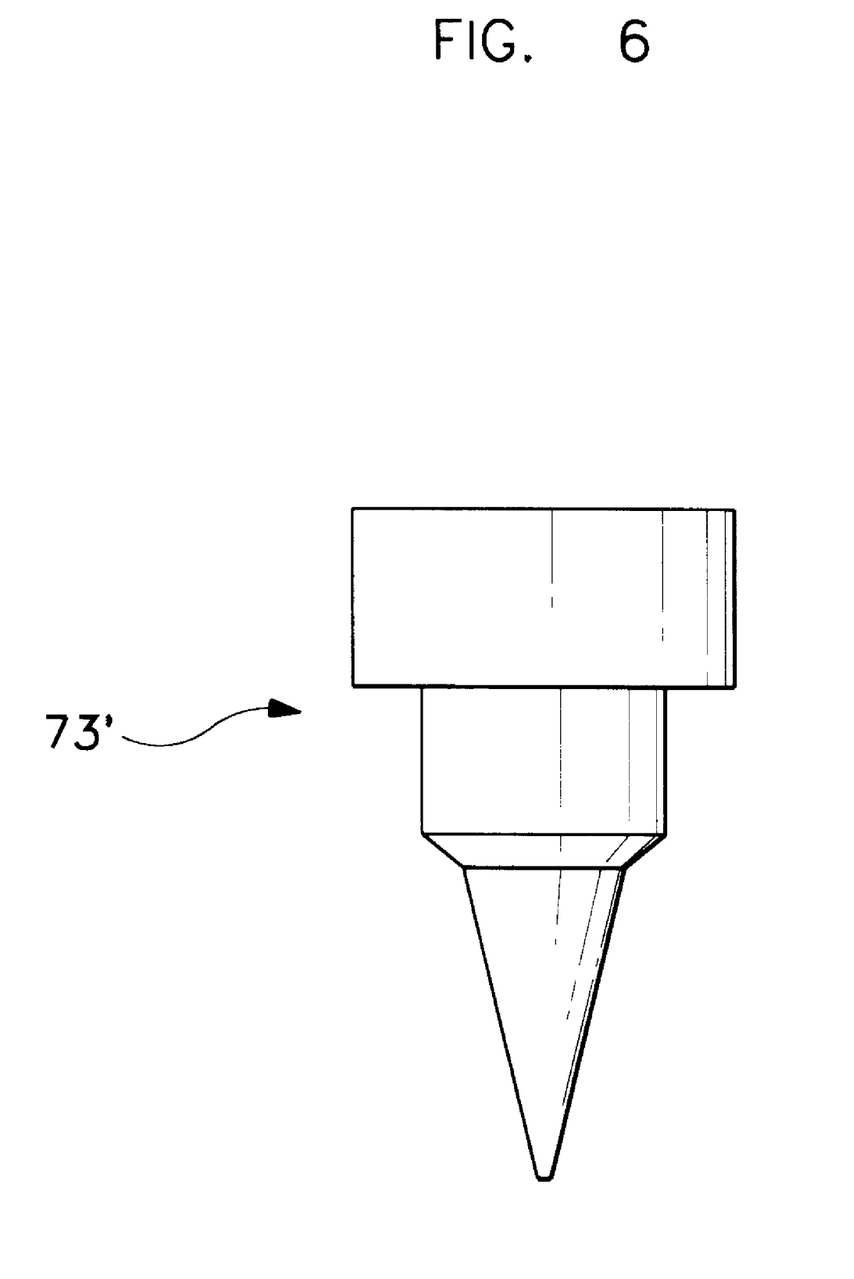
FIG. 6 is a front view of a needle valve of an electronic expansion valve according to a modified example of the present invention.

FIG. 6 shows a needle valve according to a modified example of the present invention.

As shown in the drawing, a lower or distal portion of a needle valve 73' can be tapered so that an amount of coolant passing through the expansion valve can be linearly varied. If the lower or distal portion of the needle valve 73 is multi-stepped as shown in FIG. 2, the amount of coolant is varied by stages. Therefore, according to a feature of a system where the expansion valve is employed, one of the needle valves 73 and 73' can be selectively used.

As described above in detail, the electronic expansion valve for a cooling cycle according to the present invention can be reduced in size by employing a stepping motor which is designed to have a smaller gap between a coil of a stator and a permanent magnet of a rotor, and can be easily assembled by simplifying a coupling structure of a stepping motor and a needle valve.

In addition, the inventive electronic expansion valve can precisely adjust an amount of coolant to be exhausted by exactly setting an initial position of a needle valve, improving the operation reliability.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the invention.

What is claimed is:

1. An electronic expansion valve for a cooling cycle, comprising:

a valve housing having an intake hole, an exhaust hole and an orifice formed on the exhaust hole;

a case disposed on the valve housing;

a motor disposed within the case, the motor having a rotating drive shaft extending from the case to an inside of the valve housing;

a guide tube disposed inside the valve housing, the guide tube being axially movable by rotation of the drive shaft;

a needle valve which variably opens the orifice, the needle valve being mounted on the guide tube; and a restricting means for restricting a vertical movement range of the guide tube and the needle valve mounted thereto in the valve housing, the restricting means being connected to the drive shaft and to the guide tube.

2. An electronic expansion valve as claimed in claim 1 wherein the restricting means comprises:

a rotating plate coupled to the drive shaft;

a rotating pin coupled to the rotating plate and extending axially between the guide tube and the valve housing;

a guide ring disposed around the guide tube;

a slider having a first end contacting the rotating pin and a second end supported on the guide tube so that the slider can axially move along the guide ring by rotation of the rotating pin; and proximal and distal stoppers formed on proximal and distal ends of the guide ring, respectively.

3. An electronic expansion valve as claimed in claim 2, wherein the rotating plate is provided with a plurality of coupling holes formed circumferentially about the drive shaft, in one of which coupling holes the rotating pin is selectively inserted, the coupling holes being spaced away from each other at a predetermined angle.

4. An electronic expansion valve as claimed in claim 1:

wherein a plurality of guide pins are formed on a distal end of the valve housing and extended axially to guide the axial movement of the guide tube; and wherein the guide tube comprises a) a cylindrical main body defining a hollow portion, a distal end of the cylindrical main body being opened;

b) a screw portion formed on a proximal end of the main body which is screw-coupled to the drive shaft; and c) a flange portion radially extending outwards at the distal end of the main body, the flange portion being provided with a plurality of insertion holes through which the guide pins pass to guide the axial movement of the guide tube while restricting a rotation of the guide tube.

5. An electronic expansion valve as claimed in claim 4:

wherein the needle valve comprises a larger diameter portion slidably disposed within the hollow portion of the guide tube and a smaller diameter portion extending from the larger diameter portion toward the orifice; and wherein the guide tube further comprises a bushing coupled to the opened distal end of the main body, the bushing being provided with a penetrating hole through which the smaller diameter portion of the needle valve passes.

6. An electronic expansion valve as claimed in claim 5, wherein a spring which biases the needle valve toward the orifice is disposed within the hollow portion of the guide tube.

7. An electronic expansion valve as claimed in claim 5, wherein the bushing is tightly inserted in opened distal end of the main body of the guide tube.

8. An electronic expansion valve as claimed in claim 5, wherein the bushing is screw-coupled to the opened distal end of the main body of the guide tube.

9. An electronic expansion valve as claimed in claim 1, wherein the motor comprises:

a motor housing disposed within the case, a stator having a coil and disposed within the motor housing, and a rotor having a permanent magnet and disposed within the motor housing, the rotor being disposed inside the stator and spaced away from the stator by a predetermined gap.

10. An electronic expansion valve for a cooling cycle, comprising:

a valve housing having an intake hole, an exhaust hole, and an orifice formed on the exhaust hole;

a motor having a rotating drive shaft extending inside of the valve housing;

a guide tube disposed inside the valve housing, the guide tube being axially movable by rotation of the drive shaft;

a needle valve which variably opens the orifice, the needle valve being mounted on the guide tube; and a setting means for setting an initial position of the needle valve with respect to the orifice, the setting means being disposed on the guide tube.

11. An electronic expansion valve as claimed in claim 10:

wherein a plurality of guide pins are formed on a distal end of the valve housing and extended axially to guide the axial movement of the guide tube;

wherein the guide tube comprises a) a cylindrical main body defining a hollow portion, a distal end of the cylindrical main body being opened;

b) a screw portion formed on a proximal end of the main body which is screw-coupled to the drive shaft; and c) a flange portion radially extending outwards at the distal end of the main body, the flange portion being provided with a plurality of insertion holes through which the guide pins pass to guide the axial movement of the guide tube while restricting rotation of the guide tube;

which the needle valve comprises a larger diameter portion slidably disposed within the hollow portion of the guide tube and a smaller diameter portion extending from the larger diameter portion toward the orifice; and wherein the setting means comprises a cylindrical bushing screw-coupled to the opened distal end of the main body of the guide tube to support the needle valve.

12. An electronic expansion valve as claimed in claim 11, wherein a spring which biases the needle valve toward the orifice is disposed within the hollow portion of the guide tube.

13. An electronic expansion valve as claimed in claim 11, further comprising:

a rotating plate coupled to the drive shaft;

a rotating pin coupled to the rotating plate and extending axially between the guide tube and the valve housing;

a guide ring disposed around the guide tube;

a slider having a first end contacting the rotating pin and a second end supported on the guide tube so that the slider can axially move along the guide ring by rotation of the rotating pin; and proximal and distal stoppers formed on proximal and distal ends of the guide ring, respectively.

14. An electronic expansion valve as claimed in claim 13, wherein the rotating plate is provided with a plurality of coupling holes formed circumferentially about the drive shaft, in one of which coupling holes the rotating pin is selectively inserted, the coupling holes being spaced away from each other at a predetermined angle.

* * * * *